United States Patent [19]

Brennan et al.

[11] 4,037,126

[45] July 19, 1977

[54] TIELESS BRACING FOR SUPPORTING END TURNS OF A DYNAMOELECTRIC MACHINE

[75] Inventors: Thomas E. Brennan, Voorheesville; Robert H. Hartmann, Gansevoort; Robert M. McCoy, Schenectady, all of N.Y.

[73] Assignee: General Electric Company, Schenectady, N.Y.

[21] Appl. No.: 678,601

[22] Filed: Apr. 20, 1976

[51] Int. Cl.² .............................................. H02K 3/46
[52] U.S. Cl. ...................................... 310/260; 310/270
[58] Field of Search ............... 310/260, 270, 197, 194, 310/42, 89, 91; 336/197

[56] References Cited

U.S. PATENT DOCUMENTS

| 3,435,517 | 4/1969 | Fortenbach | 310/260 |
| 3,436,580 | 4/1969 | Brennan | 310/260 |
| 3,924,149 | 12/1975 | Estrada | 310/260 |
| 3,953,921 | 5/1976 | Estrada | 310/260 |

Primary Examiner—R. Skudy
Attorney, Agent, or Firm—Vale P. Myles

[57] ABSTRACT

A tieless bracing arrangement is provided for rigidly supporting the winding end turns of a dynamoelectric machine in relatively rigid operating position. The bracing arrangement is characterized by including an expandable annulus having a spreader that is operable in conjunction with a plurality of slidably mounted dowels to selectively hold the annulus open while it is positioned adjacent to the machine end turns and then to compress the annulus tightly against the end turns to secure them in operating position.

13 Claims, 5 Drawing Figures

TIELESS BRACING FOR SUPPORTING END TURNS OF A DYNAMOELECTRIC MACHINE

BACKGROUND OF THE INVENTION

The invention disclosed herein relates to dynamoelectric machines and more particularly, to an improved means and method for readily applying a winding-clamping annulus in rigid, supporting position against axial or radial displacement of the windings.

In the manufacture of large dynamoelectric machines it is common practice to utilize form-wound coils for assembling an energizing winding in pre-formed slots of the laminated stator cores of the machines. The ends of such coils typically extend beyond the stack of stator laminations and are subjected to electrodynamic and mechanical forces that cause the coils to vibrate relative to the stator and to one another. Such forces frequently reach relatively large magnitudes due to the high current passed through such machine windings during starting and peak load operating conditions. These electrodynamic forces are additive with the mechanical vibrations developed in the machine windings by their normal rotation during operation. The designers of dynamoelectric machines have long recognized that such vibrations of the end turns is undesirable because it destroys the winding insulation and can lead to premature electrical failures within the windings.

In response to this recognized need, various prior art bracing arrangements have been developed in an attempt to more adequately support the winding end turns against relative movement during their normal anticipated application. An early example of such a supporting arrangement is shown in U.S. Pat. No. 967,240 which issued on Aug. 16, 1910 and shows a dynamoelectric machine having a pair of rings for clamping a coil around the end turns of a set of windings to force them into engagement with an inner supporting ring. In the intervening years since the issuance of that early patent, other more suitable means have been developed for better supporting such clamping rings in rigid position with respect to winding end turns. For a number of years, for example, clamping rings were lashed to winding end turns with cords or roving material that was bonded to the windings by being dipped in an insulating resin after the cords were tied in a suitable operating position, thereby to rigidify the entire winding end turn structure. Although such tying arrangements were effective for providing the desired rigid end turn configuration sought, they were relatively expensive to install and difficult to repair, thus they gave way to various types of tieless bracing arrangements.

In such so-called tieless winding arrangements, adjustable brackets and clamping bolts are frequently used to secure the winding end turns of a machine in a desired rigid operating position. One example of such a tieless supporting arrangement is shown in U.S. Pat. No. 3,293,472 which issued on Dec. 20, 1966 and is assigned to the assignee of the present invention. Likewise, an improved version of a similar tieless winding support is shown in U.S. Pat. No. 3,320,452 which issued on May 16, 1967 and is assigned to the same assignee. A particular advantage of these relatively recent tieless bracing arrangements is that they include adjustable means for selectively moving a coil positioning ring in both a radial and axial direction with respect to the stator of a machine. This adjustability feature makes it possible to reposition the winding supporting ring in the field after the machine has left the factory. A disadvantage of the type of winding supporting arrangement shown in those patents is that they require the provision of considerable access room outside of the winding end turns in order to enable workmen to reach the ring adjustment means. The provision of such additional structured space for manufacturing purposes tends to be undesirably expensive in many large dynamoelectric machines.

Even more recently, as shown in U.S. Pat. No. 3,924,149 which issued on Dec. 2, 1975 and is assigned to the same assignee as the present invention, a dynamoelectric machine winding end turn supporting arrangement has been developed that enables a clamping annulus to be compressed against the windings of the machine in their assembled position, without requiring the provision of large amounts of operating room to make such a manufacturing installation and adjustment.

Accordingly, it is a primary object of the present invention to provide a tieless stator end turn supporting arrangement and method that overcomes the disadvantages and objections of related prior art supporting arrangements and methods.

Another object of the invention is to provide a tieless dynamoelectric machine end turn supporting arrangement that incorporates a movable adjustment means for simultaneous movement in both radially inward and axial directions relative to the end turns to apply a compressive force to a winding-supporting annulus and winding end turns therein.

Yet another object of the invention is to provide a tieless supporting arrangement for dynamoelectric machine winding end turns that is readily manufactured and assembled and that provides a more reliable winding support than is known to be afforded by related prior art supporting structures.

A further object of the invention is to provide an improved method for bracing the winding end turns of a dynamoelectric machine in a relatively rigid operating position.

Additional objects and advantages of the invention will become apparent to those skilled in the art from the description of it that follows taken in conjunction with the accompanying drawings.

SUMMARY OF THE INVENTION

In one preferred embodiment of the invention a winding compressing split annulus is rigidly supported in a desired operating position by a plurality of angularly spaced dowels that are slidably mounted in a series of brackets affixed to either a stator core or frame assembly of a dynamoelectric machine in which the winding is positioned. The winding-clamping annulus includes a spreader assembly affixed to one of its ends and operable to hold the annulus in a relatively open position while it is placed in a desired relationship to the winding end turns during manufacture of the machine. After the clamping annulus is thus positioned, the dowel-supporting brackets are secured relative to the frame or stator of the machine and the dowels are moved toward the clamping annulus in respective directions substantially perpendicular to the winding end turns closest thereto. The dowels are then fastened in their radially innermost clamping positions to hold the end turns in a desired rigid operating relationship. An important aspect of the invention is the novel method disclosed herein by which the tieless bracing apparatus of the invention is preferably utilized to rigidly clamp winding end turns of a dynamoelectric machine in a relatively rigid operating position.

DESCRIPTION OF THE PREFERRED EMBODIMENTS

Figure 1:
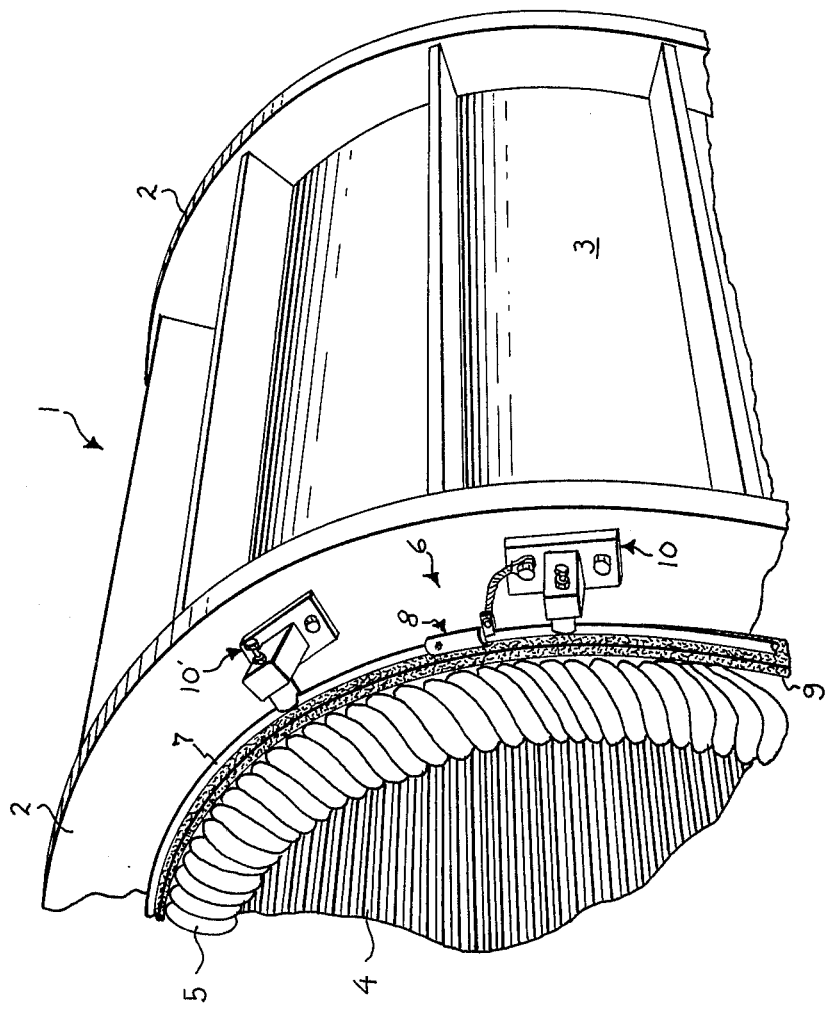
FIG. 1 is a perspective view of a dynamoelectric machine stator assembly that is provided with a tieless bracing arrangement constructed in accordance with the present invention.

Referring now to FIG. 1 of the drawings, it will be seen that there is shown a dynamoelectric machine core assembly 1 which may form a part of either an electric motor or generator that has generally conventional components except for the novel features of the tieless bracing means disclosed herein. The core assembly 1 includes a rigid frame 2 and a magnetic stator 3 that is mounted in fixed relationship within the frame by any suitable means, such as by clamping the stator between the end compression flanges and the ribs of the frame 2. The stator 3 is provided with a plurality of longitudinal winding slots at angularly spaced points around its inner circumference, as is well-known. One of these winding slots is indicated by the identifying numeral 4. The stator slots are, of course, adapted to receive the respective sides of the coils of an energizing winding of the machine. One end of the winding end turns of the energizing coil is designated in FIG. 1 by numeral 5. The respective winding coils may be electrically connected together in any suitable manner to form an energizing winding for the machine 1.

The winding end turns 5 are rigidly secured in a desired operating position by the tieless bracing means of the invention, indicated generally by the numeral 6. The bracing means 6 comprises a radially adjustable split metal annulus 7 that is formed of any suitable cold rolled steel in the preferred embodiment of the invention being described. It should be understood that other suitable materials, such as aluminum or reinforced plastic, may be used to form such a supporting annulus (7) in other embodiments of the invention. A spreader means 8 is mounted on one end of the annulus 7 and is operable, as will be more fully explained below, to hold the ends of the annulus in a predetermined spaced relationship with respect to one another during one step in the assembly of the machine. In this embodiment of the invention a ring of compressible material 9, such as felt or other suitably conformable insulating material, such as glaskyd taped with felt, is positioned in engagement with the inner side of the annulus 7 around substantially the entire circumference thereof. Of course, rather than being formed from a single loop of felt material, the ring 9 may be formed by winding several relatively thin layers of felt around the end turns in order to build up a ring 9 of desired thickness to appropriately cushion the compressive force exerted by the annulus 7 on the winding end turns 5.

Pursuant to the present invention, a plurality of adjustable annulus-positioning means, two of which are designated in FIG. 1 by the identifying numbers 10 and 10', are mounted on the frame 2 at angularly spaced points radially outward from the end turns 5 that extend beyond the ends of stator 3. The novel structural details of the annulus-positioning means 10 and 10' will be described in greater detail hereinafter with reference to FIGS. 2-5 of the drawings; however, before undertaking that description reference will now be made to FIGS. 4 and 5 of the drawings to describe the unique structure and characteristics of the spreader means 8 used with this preferred embodiment of the invention.

Figure 4:
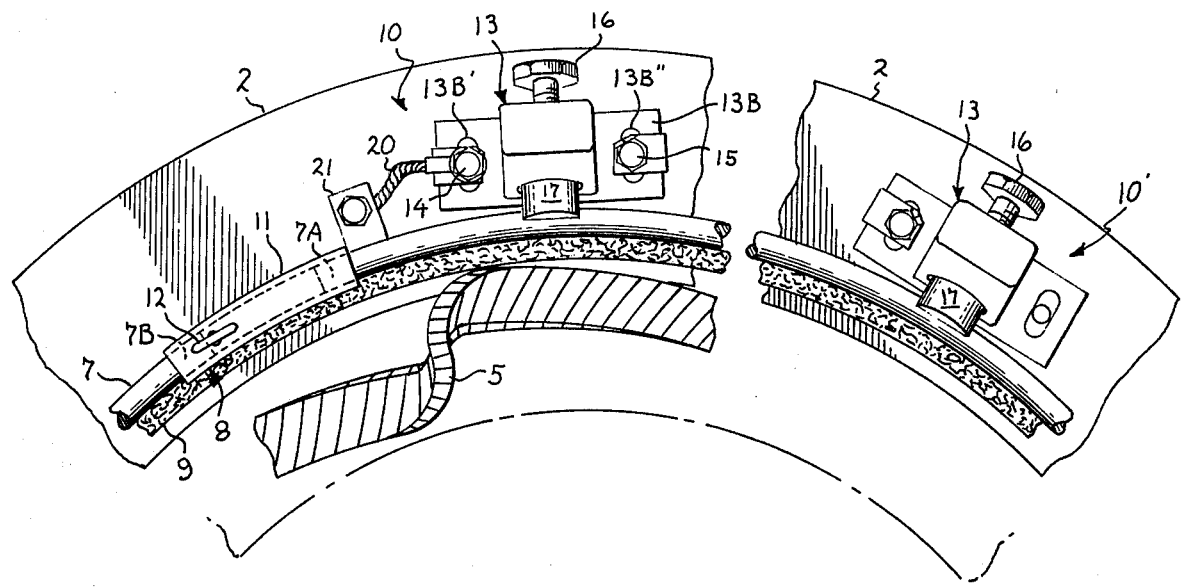
FIG. 4 is an end plan view of a portion of the clamping annulus of the invention shown in FIG. 1, illustrating the details of an annulus spreader mechanism that is used with the tieless bracing arrangement of the invention.
Figure 5:
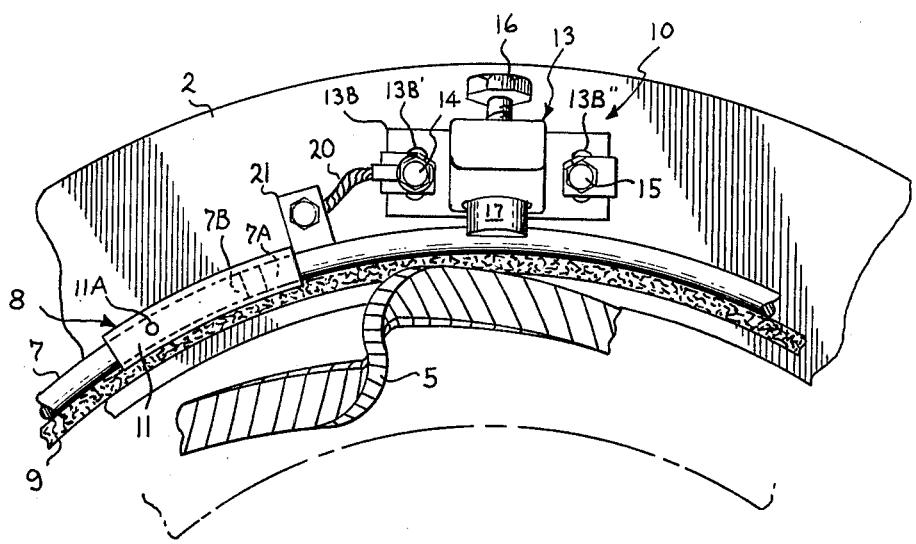
FIG. 5 is another end plan view of the same portion of the clamping annulus illustrated in FIG. 4 showing the annulus spreader structure in a position such that the annulus is substantially compressed relative to its position as shown in FIG. 4.

As shown in FIGS. 4 and 5, the spreader means 8 in this form of the invention comprises the combination of a metal tube 11 that is secured to one end 7a of the annulus 7 by being welded thereto. The other end of the tube 11 is positioned over and slidably receives the opposing end 7b of the annulus 7. Spreader means 8 further includes an eyebolt 12, seen only in FIG. 4, which is operable to the positioned through apertures 11a that are formed respectively in opposite sides of the tube 11 adjacent the free end thereof, as shown in FIGS. 4 and 5.

Figure 2:
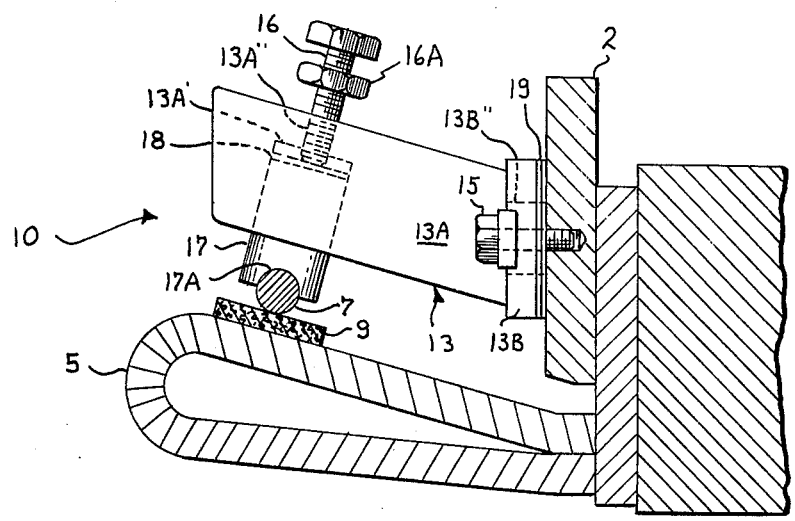
FIG. 2 is a side elevation view of a portion of the stator assembly depicted in FIG. 1, showing the details of a mounting bracket and an associated annulus-receiving dowel that are used pursuant to the invention to position a radially adjustable clamping annulus of the type shown in the embodiment of the invention depicted in FIG. 1.
Figure 3:
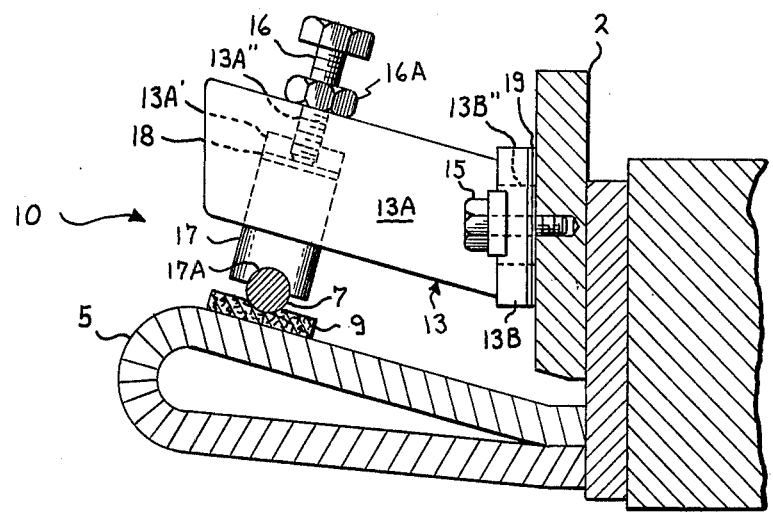
FIG. 3 is a side elevation view of the same portion of a winding end turn and stator assembly shown in FIG. 2, with the annulus supporting means of the invention shown in an operating position in which the clamping annulus has compressed a conformable material positioned between it and the end turns, thereby to radially compress the winding end turns.

As indicated above, the function of the spreader means 8 is to hold the ends 7a and 7b of the annulus 7 in spaced relationship, as seen in FIG. 4, when the annulus is loosely placed around the winding end turns 5 during the initial manufacturing steps used to make the machine. In operation, the annulus 7 is spread apart, as shown in FIG. 4, with the end 7b positioned to one side of the apertures 11a in the tube 11, then the eyebolt 12 is inserted through the apertures 11a and the annulus 7 is allowed to close sufficiently to bring the end 7b thereof to rest against the eyebolt 12. With the annulus thus maintained in its expanded condition, a felt ring 9, or other suitable material as mentioned above, is positioned under the annulus 7, around the winding end turn 5, as shown in FIGS. 1, 4 and 5 of the drawings. With the felt ring 9 thus placed in position, the eyebolt 12 is removed from the apertures 11a in tube 11 so that the annulus 9 may be compressed to the position indicated in FIG. 5 by exerting a compressive force on the annulus 7 (as in FIG. 3). At the outset, it will be understood that each of the clamping means 10, 10', etc. is substantially identical in configuration; thus, a description of the clamping means 10 illustrated in FIGS. 2 and 3 will suffice to describe the structure and mode of operation of all of the annulus-positioning means of the invention. Thus, as seen in FIGS. 2 and 3 it will be seen that each of these positioning means comprises a generally T-shaped bracket 13 that is mounted on the frame 2 with the trunk 13a of the bracket 13 generally parallel to, and spaced from the closest stator winding end turns 5. The cross-bar 13b of the bracket 13 is secured in position, tightly against the frame 2 by a pair of threaded bolts 14 and 15 (also see FIGS. 4 and 5) that are inserted through elongated mounting apertures 13b' and 13b" provided by suitable wall means defined in the cross-bar 13b. As can best be seen in FIGS. 4 and 5, each of the elongated mounting apertures 13b' and 13b" is disposed with its longitudinal axis perpendicular to the annulus 7 in order to allow the bracket 13, and the other similar brackets, to be moved radially with respect to the annulus when the bolts 14 and 15 used to secure the brackets in operating position are sufficiently loosened to permit such movement. Of course, it will be understood that a pair of suitably threaded apertures will be formed in the frame 2 to receive the bolts 14 and 15 therein. A particular mode of operation of the bolts 14 and 15 relative to a desired movement and positioning of the bracket 13 will be more fully described below in connection with the preferred method of the invention.

To afford the desired annulus-positioning objective of the invention, the trunk 13a of bracket 13 includes a first wall means of suitable configuration to define a cup-shaped recess 13a' in the side of the bracket 13 closest to the stator winding end turns 5. A second wall means in the trunk 13a defines a threaded aperture 13a" that extends through the bracket 13 from the bottom of the recess 13a' to the radially outermost side of the bracket. A threaded bolt 16 is rotatably threaded into the aperture 13a" with the head of the bolt projecting from the outer surface of the bracket, as clearly seen in FIGS. 2 and 3.

In order to fasten the respective bolts 16 in their innermost, annulua-compressing positions, pursuant to the invention, a suitable fastening means is provided for each of the bolts. In the embodiment of the invention described herein the fastening means 16a comprises a nut threaded onto each bolt 16 as shown in FIGS. 2 and 3. In operation, after the bolt 16 has been rotated to a desired operating position, as shown in FIG. 3, the nut or fastening means 16a is rotated into firm engagement with the outer surface (as seen in FIG. 3) of the trunk 13a of the T-shaped bracket 13, to lock the bolt 16 in its innermost position.

Finally, the annulus-positioning means 10 shown in FIGS. 2 and 3 includes a dowel 17 having a transverse groove 17a across its inner face to encompass an outer surface portion of the metal annulus 7 and hold it against radial or axial movement relative to the ring of compressible material 9. In the preferred embodiment of the invention the dowel 17 is formed of an insulating material such as resin bonded glass strands and the transverse annulus receiving groove 17a formed therein is less than half as long in arcuate extent as the axial length of the dowel 17, as measured radially between the metal annulus 7 which it engages and the point of contact between the dowel and the inner end of bolt 16.

In accordance with the present invention, it is desirable to cause the dowels 17 to slide in their respective cup-shaped recesses 13a' in a direction that is maintained substantially perpendicular to the stator winding end turns 5 disposed closest to the dowels 17. Such a desired objective is afforded, with the illustrated embodiment, by forming the T-shaped member 13, as shown in FIGS. 2 and 3, so that the trunk 13a thereof is disposed at an angle to the cross-bar 13b. Preferably, this results in the trunk 13a being substantially parallel to the winding end turns 5 closest thereto; however, it has been found that as long as the brackets 13 are positioned at an angle in the range of 5° to 40° relative to the longitudinal axis of the stator 3, a satisfactorily simultaneous radial and longitudinal movement of each dowel 17 is provided when its associated bolt 16 is moved inward to compress the dowel against the annulus 7. Further, to this end, it is desirable to have the dowel 17 snugly fitted within the recess 13a', therefore, in the preferred embodiment described herein each of the recesses 13a' is made generally cylindrical with its longitudinal axis substantially perpendicular to the longitudinal axis of the trunk 13a in which it is located. And each dowel 17 is formed to fit relatively closely within the respective sides of its cup-shaped recess 13a' in order to force the dowel 17 to slide in a substantially perpendicular direction relative to the cylindrical sides of the cup-shaped recess 13a', thereby to compress the annulus 7 substantially perpendicularly against the winding end turns 5.

In order to facilitate the driving operation of the bolts 16 on the outer surface of the dowel 17, as shown in FIGS. 2 and 3, a plate member 18 is positioned in the cup-shaped recess 13a' between the dowel 17 therein and the bolt 16 used to slide a dowel radially toward the metal annulus 7. Any suitable steel plate may be used to form the plate member 18, but in the preferred embodiment of the invention a conventional metal washer is used for this member. Thus, it can be seen that as the bolt 16 is forced into the cup-shaped recess 13a', it slides on the plate member 18 and drives it against the associated dowel 17 to force the dowel to move inwardly, as desired, when the metal annulus 7 is being clamped against the end turns 5. The plate member 18 serves to protect the dowel 17 from damage by bolt 16.

From the foregoing description of the structure of the invention, it is believed that its general mode of operation will be understood by those skilled in the art; accordingly, before describing the operation more fully in connection with a description of the preferred method of the invention, some further features of this preferred embodiment will be described. In order to provide a means for roughly positioning the T-shaped bracket 13 longitudinally with respect to the winding end turns 5, prior to the time that the dowels 17 are compressed inwardly, a plurality of shims 19 may be provided between the frame 2 and the bracket cross-bar 13b, as shown in FIGS. 2 and 3. By the use of such shims the T-shaped brackets 13 can be quickly positioned a given distance outward from the end of the stator 13 before the bracket is secured in position by the bolts 14 and 15. It should also be mentioned that in some alternative embodiments of the invention it is desirable to replace the bolts 14 and 15 with other fastening means, such as conventional welding procedures. Thus, in some such embodiments of the invention the cross-arms 13b of brackets 13 are secured in fixed position relative to the stator 3 by being welded to it or the frame 2.

Finally, in yet another embodiment of the invention it may be desirable to electrically isolate the brackets 13 from the conductive metal annulus 7 to reduce circulating currents in the annulus. To effect that result, suitable insulating separator means, such as the insulating dowels 17 described above may be used. By disposing such insulating dowels between the annulus 7 and each trunk 13a of the respective brackets 13 (as seen in FIG. 2, for example) the brackets can be electrically isolated from the annulus. In the event that such isolating means are employed, it would normally be desirable to electrically ground at least one point on the annulus 7 to the frame 2. Such a grounding means is shown in the form of a grounding cable 20, in FIGS. 4 and 5, which is secured to a bracket 21 welded to the annulus 7 near the end 7a thereof. The cable is also secured by the bolt 14 in electrically conducting relationship with the frame 2. In other forms of the invention, the dowels 17 may be formed of steel or other conductive materials.

The tieless bracing means of the invention may be applied to rigidly support the end turns of a dynamoelectric machine by a number of different sequences of operating steps, as will be apparent to those skilled in motor manufacture. It has been found, however, that a preferred unique method is particularly advantageous and that method will now be described in greater detail. Pursuant to the most preferred tieless method of bracing a winding end turn of a dynamoelectric machine pursuant to the present invention, the following manufacturing sequence is recommended. First, a dynamoelectric machine having a frame with a stator mounted therein is provided. Of course, the stator has slots adapted to receive a form-wound, insulated winding therein and the winding has ends turns that extend beyond opposite ends of the machine frame when the winding is assembled in its operating position within the stator slots. Next, a plurality of generally T-shaped brackets, such as those described above, are mounted on the machine frame at angularly spaced points radially outward from the winding end turns. As indicated, these brackets may be secured to the frame by being either welded thereto or by being bolted into position. Any suitable number of such brackets may be used but it has been found desirable to use at least six equally spaced brackets on larger dynamoelectric machines, such as those having a horsepower rating in excess of 150 horsepower, in order to uniformly distribute the annulus clamping force transmitted from the brackets. Each of the brackets thus provided includes a cup-shaped recess therein facing the stator winding, and further includes a threaded aperture through the base of the cup-shaped recess in order to receive a dowel-driving bolt therethrough, as described above with reference to FIGS. 2 and 3 of the drawings. Subsequently, a transversely grooved dowel and an associated dowel-driving bolt are mounted respectively in each cup-shaped recess and associated threaded aperture in the respective brackets. As indicated above, a suitable plate member, or washer, such as the member 18 above with reference to FIG. 2, may be inserted between the respective dowels and the bottoms of their associated cup-shaped recesses if desired.

After the plurality of brackets are at least loosely mounted on the machine frame, a split metal annulus having a suitable spreader means, such as the spreader means 8 described above, is provided and positioned over the machine end turns and loosely fitted within the transverse grooves of the respective dowels. The annulus spreader means are adjusted to open the annulus to a desired extent relative to the end turns in order to position the annulus at a desired longitudinal position with respect to the winding end turns and the machine frame. With the annulus thus held in a suitable longitudinal position by the loosely held dowels a compressible ring of felt or other suitable material is positioned between the annulus and the stator winding end turns. To complete the annulus positioning operation of the preferred method, the spreader means is released to ready the annulus for compression. The annulus is then clamped at a predetermined diameter against the stator winding end turns by adjusting each of the dowel-driving bolts threaded in the respective brackets in sequence to slide the transverse grooves of each of the dowels against the annulus, forcing it to be compressed radially inward and to be slid axially outward from the machine stator. Finally, the winding and felt ring are impregnated with insulating resin and the resin is cured by a conventional baking process to complete the tieless bracing method of the invention.

The foregoing preferred method steps are suitable for practicing the invention and should provide a complete understanding of its operation. However, to further explain some preferred modifications of the method of the invention it should be understood that when practicing its most preferred embodiment each of the generally T-shaped brackets described above is preferably formed of two pieces of bar stock that are welded or otherwise joined together. As indicated in the drawings, such bar stock is preferably of a generally rectangular cross-section and has the larger surface area sides of the crossbars of the respective T-shaped brackets mounted substantially flat against a flat surface of the stator frame 2 that lies in a plane substantially perpendicular to the longitudinal axis of the stator winding. Thus, one of the smaller surface area sides of the respective trunks of the T-shaped brackets is disposed in a plane substantially parallel to the stator winding end turn surface that is closest to it, due to the preferred relative angular orientation between the cross-bar and trunk of each bracket, as described above relative to the most preferred embodiment of the apparatus of the invention. In other forms of the invention, the T-shaped brackets may be formed by a suitable casting operation.

Although the foregoing method steps of the preferred form of the invention are sufficient to rigidly clamp the metal annulus in operating position around the winding end turns, it is desirable to provide bolt fastening means, such as the locking nut discussed above, on each of the dowel-driving bolts. Accordingly, in a most preferred alternative embodimemt of the method of the invention, each of the bolt fastening means is used to lock the respective bolts in their desired position around the annulus after the respective dowels have been driven against the annulus to compress it in operating position against the winding end turns.

It will be recognized by those familiar with the motor manufacturing field that various alternative forms and embodiments of the invention may be developed from the teaching of it presented therein. Accordingly, it is our intention to encompass within the following claims the true spirit and scope of the invention.

What we claim as new and desire to secure by Letters Patent of the United States is:

1. Tieless bracing means for winding end turns of a dynamoelectric machine comprising a radially expandable and contractable split metal annulus, spreader means mounted on said annulus, said spreader means being operable to hold the ends of said annulus in a predetermined spaced relationship with one another, a ring of compressible material positioned in engagement with the inner side of said annulus around substantially the entire circumference thereof, in combination with a dynamoelectric machine frame having a stator mounted therein with insulated stator winding end turns extending beyond the ends of the stator core laminations, and a plurality of adjustable annulus-positioning means mounted on said frame at angularly spaced points radially outward from the end turns, each of said positioning means comprising:

a. a generally T-shaped bracket mounted on the frame with the trunk of the bracket generally parallel to the closest stator winding end turns and spaced therefrom, said trunk of the bracket including first wall means defining a cup-shaped recess in the side of the bracket closest to the stator winding ends, and second wall means defining a threaded aperture extending through the bracket from the bottom of said recess to the radially outermost side of the bracket, and a threaded bolt rotatably threaded into said threaded aperture with the head of the bolt projecting from the outer surface of the bracket, b. a dowel having a transverse groove across its inner face slidably mounted within the cup-shaped recess, said transverse groove being positioned to partially encompass an outer surface portion of said metal annulus to hold it against said ring of compressible material, and c. fastening means mounted on each threaded bolt to secure it in a desired operating position after the respective bolts have been rotated to force their inner ends against the dowels associated therewith to locate the annulus in a desired predetermined position with respect to the stator winding end turns.

2. An invention as defined in claim 1 wherein each of said dowels is formed of insulating material and the transverse annulus-receiving groove formed therein is less than half as long in arcuate extent as the axial length of the dowel, measured between the metal annulus which is engages and the point of contact between it and the bolt engaging the outer end of the dowel.

3. An invention as defined in claim 1 wherein each of said fastening means comprises a nut threaded on said bolt and rotated into firm engagement with the outer surface of said trunk of the T-shaped bracket.

4. An invention as defined in claim 1 wherein the longitudinal axis of each of said trunks of the T-shaped brackets is positioned at an angle in the range of about 5° to about 40° relative to the longitudinal axis of the stator winding, and wherein each of said cup-shaped recesses in said trunks is generally cylindrical with its longitudinal axis substantially perpendicular to the longitudinal axis of the trunk in which it is located, said dowels being relatively closely fitted within the sides of their respective cup-shaped recesses thereby to cause said dowels to slide relative to the sides of the recess in a direction substantially perpendicular to the stator winding end turns disposed closest to it.

5. An invention as defined in claim 4 wherein each of the cross-bars of the T-shaped brackets is provided with a pair of elongated mounting apertures for receiving bolts that are effective to secure the bracket to said stator, each of said elongated mounting apertures being disposed with their longitudinal axis perpendicular to said annulus, thereby to allow the brackets to be moved radially with respect to said annulus when the bolts used to secure the brackets against the stator frame are loosened to allow such movement.

6. An invention as defined in claim 5 including a plurality of shims disposed respectively between the stator and the cross-bars of the T-shaped brackets to position the brackets a given distance outward from the end of the stator.

7. An invention as defined in claim 4 wherein the cross-arms of the T-shaped brackets are secured in fixed position relative to the stator by being welded to it.

8. An invention as defined in claim 7 wherein said ring of compressible material is felt and wherein said spreader means comprises the combination of a metal tube secured to one end of the metal annulus, and an eyebolt is positioned through apertures in the sides of the tube adjacent the free end thereof, said eyebolt being operable to engage the other end of the metal annulus and hold it in spaced relationship with respect to the end of the annulus having the tube welded on it.

9. An invention as defined in claim 7 including a plurality of plate members, each positioned, respectively, in one of said cup-shaped recesses between the dowel therein and the bolt used to slide said dowel radially toward the metal annulus, each of said plate members being driven against its associated dowel by the bolt cooperating therewith.

10. An invention as defined in claim 8 including insulating separator means disposed between said metal annulus and the brackets to electrically isolate the brackets from the annulus.

11. An invention as defined in claim 10 wherein said insulating separator means comprises insulating material used to form each of said dowels.

12. An invention as defined in claim 8 wherein each of said generally T-shaped brackets is formed of two pieces of bar stock joined together, said bar stock being generally rectangular in cross-section, and wherein one of the larger surface area sides of the cross-bar of the T-shaped bracket is mounted substantially flat against a flat surface of said stator frame that lies in a plane substantially perpendicular to the longitudinal axis of the stator winding, and one of the smaller surface area sides of the trunk of said T-shaped bracket is disposed in a plane substantially parallel to the stator winding end turn surface closest to it.

13. An invention as defined in claim 4 wherein each of said generally T-shaped brackets is formed of a single piece of cast iron.

* * * * *